(12) United States Patent
Le Pifre

(10) Patent No.: US 9,235,591 B2
(45) Date of Patent: Jan. 12, 2016

(54) CONTEXTUAL DATA COMPRESSION FOR GEO-TRACKING APPLICATIONS

(71) Applicant: TELIT AUTOMOTIVE SOLUTIONS NV, Leuven (BE)

(72) Inventor: Pierre Le Pifre, Hermanville sur Mer (FR)

(73) Assignee: Telit Automotive Solutions, Leuven (BE)

( * ) Notice: Subject to any disclaimer, the term of this patent is extended or adjusted under 35 U.S.C. 154(b) by 93 days.

(21) Appl. No.: 13/782,712

(22) Filed: Mar. 1, 2013

(65) Prior Publication Data

US 2013/0238573 A1    Sep. 12, 2013

(30) Foreign Application Priority Data

Mar. 7, 2012  (EP) ..................................... 12290078

(51) Int. Cl.
| | | |
|---|---|---|
| *G06F 17/00* | (2006.01) | |
| *G06F 17/30* | (2006.01) | |
| *G01S 19/03* | (2010.01) | |
| *G01S 5/00* | (2006.01) | |

(52) U.S. Cl.
CPC ......... *G06F 17/30153* (2013.01); *G01S 5/0018* (2013.01); *G01S 19/03* (2013.01)

(58) Field of Classification Search
CPC .. G06F 17/30153; G01S 19/03; G01S 5/0018
USPC ........................................................ 707/693
See application file for complete search history.

(56) References Cited

U.S. PATENT DOCUMENTS

| | | | | |
|---|---|---|---|---|
| 6,141,454 A | * | 10/2000 | Seymour .................. | G06T 9/20 |
| | | | | 382/108 |
| 6,266,008 B1 | * | 7/2001 | Huston et al. ............ | 342/357.46 |

(Continued)

FOREIGN PATENT DOCUMENTS

| | | |
|---|---|---|
| CN | 1948990 | 4/2007 |
| EP | 1 055 936 A2 | 11/2000 |
| EP | 1 906 199 A1 | 4/2008 |

OTHER PUBLICATIONS

Lange, Ralph, et al., "Making the World Wide Space Happen: New Challenges for the Nexus Context Platform", PerCom 2009, Galveston, TX, Mar. 9-13, 2009, pp. 1-4.*

(Continued)

*Primary Examiner* — Robert Stevens
(74) *Attorney, Agent, or Firm* — Pearl Cohen Zedek Latzer Baratz LLP

(57) ABSTRACT

Various exemplary embodiments relate to a method of compressing location data. The method may include: receiving original location data; selecting a contextual profile based at least in part on the original location data; selecting a compression method based on the contextual profile; and converting the original location data to a compressed format based on the compression method. Various exemplary embodiments relate to a system for compressing location data. The system may include: a location receiver configured to generate original location data based at least on signals from global navigation satellite system (GNSS) satellites; a location engine configured to select a contextual profile based at least in part on the original location data; and a contextual compression filter configured to generate compressed location data in a compressed format based on the selected contextual profile.

18 Claims, 5 Drawing Sheets

(56) References Cited

U.S. PATENT DOCUMENTS

| | | | |
|---|---|---|---|
| 6,324,213 B1 * | 11/2001 | Harrison | 375/240 |
| 6,411,899 B2 * | 6/2002 | Dussell et al. | 701/468 |
| 6,429,811 B1 * | 8/2002 | Zhao et al. | 342/357.66 |
| 6,703,947 B1 * | 3/2004 | Wallner | H03M 7/30 341/50 |
| 7,215,255 B2 * | 5/2007 | Grush | 340/932.2 |
| 7,218,938 B1 * | 5/2007 | Lau et al. | 455/456.1 |
| 7,502,620 B2 * | 3/2009 | Morgan | H04L 29/12009 370/328 |
| 7,818,017 B2 * | 10/2010 | Alizadeh-Shabdiz et al. | 455/456.6 |
| 2002/0055924 A1 * | 5/2002 | Liming | 707/100 |
| 2006/0244587 A1 * | 11/2006 | Humphries et al. | 340/539.13 |
| 2009/0201199 A1 | 8/2009 | Preston et al. | |
| 2011/0219009 A1 | 9/2011 | Rosenfeld et al. | |
| 2012/0038633 A1 * | 2/2012 | Clark et al. | 345/419 |

OTHER PUBLICATIONS

Lawson, Catherine T., et al., "Compression and Mining of GPS Trace Data: New Techniques and Applications", Final Report: Region II University Transportation Research Center, University at Albany—SUNY, Mar. 11, 2011, 25 pages.*

Lever, Ryan, et al., "Compressing GPS Data on Mobile Devices", OTM Workshops 2006, LNCS 4278, Springer-Verlag, Berlin, Germany, © 2006, pp. 1944-1947.*

Muckell, Jonathan, et al., "Algorithms for Compressing GPS Trajectory Data: An Empirical Evaluation", ACM GIS '10, San Jose, CA, Nov. 2-5, 2010, pp. 402-405.*

Muckell, Jonathan, et al., "SQUISH: An Online Approach for GPS Trajectory Compression", COM.Geo '11, Washington, DC, May 23-25, 2011, Article No. 13, 8 pages.*

Randell, Cliff, et al., "Context Awareness by Analysing Accelerometer Data", The Fourth International Symposium on Wearable Computers, Atlanta, GA, Oct. 16-17, 2000, pp. 175-176.*

Hönle, Nicola, et al., "Usability Analysis of Compression Algorithms for Position Data Streams", ACM GIS '10, San Jose, CA, Nov. 2-5, 2010, pp. 240-249.*

Cudre-Mauroux, Philippe, et al., "TrajStore: An Adaptive Storage System for Very Large Trajectory Data Sets", ICDE 2010, Long Beach, CA, Mar. 1-6, 2010, pp. 109-120.*

Kellaris, Georgios, et al., "Trajectory Compression under Network Constraints", SSTD 2009, LNCS 5644, Springer-Verlag, Berlin, Germany, © 2009, pp. 392-398.*

Yan, Zhixian, et al., "SeTraStream: Semantic-Aware Trajectory Construction over Streaming Movement Data", SSTD 2011, LNCS 6849, Springer-Verlag, Berlin, Germany, © 2011, pp. 367-385.*

Ibrahim, Khaled, et al., "CASCADE: Cluster-based Accurate Syntactic Compression of Aggregated Data in VANETS", 2008 IEEE Globecom Workshops, New Orleans, LA, Nov. 30-Dec. 4, 2008, pp. 1-10.*

Microsoft Computer Dictionary, 5th Edition, Microsoft Press, Redmond, WA, © 2002, pp. 118 and 142.*

"GPS Tracking Unit", retrieved from the Internet at: http://en.wikipedia.org/wiki/GPS_tracking_unit (retrieved Feb. 2013).

Extended European Search Report for European Patent Appln. No. 12290078.0 (Sep. 28, 2012).

* cited by examiner

CONTEXTUAL DATA COMPRESSION FOR GEO-TRACKING APPLICATIONS

CROSS-REFERENCE TO RELATED APPLICATIONS

This application claims the priority under 35 U.S.C. §119 of European patent application no. 12290078.0, filed on Mar. 7, 2012, the contents of which are incorporated by reference herein.

TECHNICAL FIELD

Various exemplary embodiments disclosed herein relate generally to compression of location data.

BACKGROUND OF THE INVENTION

In a Global Navigation Satellite System (GNSS), a receiver determines its location based on signals received from a plurality of satellites. Various standards exist for communicating and storing location and telemetry data. These standards include National Marine Electronics Association (NMEA) 0183 and Java Specification Request (JSR) 179. These standards define formats for various elements of location data.

GNSS receivers are currently used for a variety of applications. Location data from a GNSS receiver may be used locally or transmitted to a remote location. Exemplary uses of location data include navigation systems, fleet management, photo tagging and social networking. Geo-tracking applications may determine location data frequently and store the location data. A geo-tracking application that constantly records location data or compiles location data from multiple GNSS receivers may consume a large amount of storage space for the location data.

SUMMARY OF THE INVENTION

In view of the foregoing, it would be desirable to provide a method and system for compressing location data. In particular, it would be desirable to use the location data to determine an appropriate compression method for a particular application and location.

In light of the present need for a method and system for compressing location data, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of compressing location data. The method may include: receiving original location data; selecting a contextual profile based at least in part on the original location data; selecting a compression method based on the contextual profile; and converting the original location data to a compressed format based on the compression method.

In various alternative embodiments, the method further includes: receiving second location data; determining that the contextual profile no longer applies; selecting a second contextual profile; selecting a second compression method based on the second contextual profile; and converting the second location data to a second compressed format using fewer bits than the second location data according to the second compression method.

In various alternative embodiments, the original location data includes a plurality of component values including a longitude value and a latitude value and the step of selecting a contextual profile includes: comparing the longitude value and the latitude value of the original location data to a geographical area defined for a contextual profile; and selecting the contextual profile if the longitude and latitude are within the geographical area.

The contextual profile may include, for each component of the original location data: a base value, a precision value, and a number of bits, wherein each component of the original location data is stored using the corresponding number of bits. The step of converting the original location data may include, for each original component value: generating an intermediate value by subtracting the base value from the original component value; generating a compressed value by dividing the intermediate value by the precision value; and storing the compressed value in the compressed format.

In various alternative embodiments, the method may also include storing an indication of the selected contextual profile.

In various alternative embodiments, the method may also include determining, based on a contextual profile, compression parameters including a number of bits, a precision value, and a base value; reading the number of bits from a stored compressed value; generating an intermediate value by multiplying the read bits by the precision value; and generating a location data component by adding the base value to the intermediate value.

In various alternative embodiments, original location data includes a plurality of component values including a speed value and the step of selecting a contextual profile includes: using the speed value to determine a mode of transportation; and selecting a contextual profile based on the mode of transportation.

In various alternative embodiments, the step of converting the original location data to a compressed format includes scaling a component of the original location data.

In various alternative embodiments the step of converting the original location data to a compressed format includes converting a component of the original location data to a relative measurement. Various exemplary embodiments relate to the above described methods encoded as instructions on a non-transitory machine-readable medium. The non-transitory machine-readable medium may include instructions that if executed by a processor of a geo-tracking device perform the above described method.

Various exemplary embodiments relate to a system for compressing location data. The system may include: a location receiver configured to generate original location data based at least on signals from global navigation satellite system (GNSS) satellites; a location engine configured to select a contextual profile based at least in part on the original location data; and a contextual compression filter configured to generate compressed location data in a compressed format based on the selected contextual profile.

In various alternative embodiments, the system may also include a data storage device configured to store the compressed location data. In various alternative embodiments, the system may also include a wireless modem configured to transmit the compressed location data.

In various alternative embodiments, the original location data includes a plurality of component values including a longitude value and a latitude value. The location engine may be configured to: compare the longitude value and the latitude value of the original location data to a geographical area defined for a contextual profile; and select the contextual profile if the longitude and latitude are within the geographical area.

In various alternative embodiments, the contextual profile includes for each component of the original location data: a base value, a precision value, and a number of bits, wherein each component of the original location data is stored in the compressed format using the corresponding number of bits. The contextual compression filter may be configured to, for each original component value: generate an intermediate value by subtracting the base value from the original component value; generate a compressed value by dividing the intermediate value by the precision value; and store the compressed value in the compressed format.

In various alternative embodiments, the contextual compression filter is further configured to store an indication of the selected contextual profile.

In various alternative embodiments, the system includes a processor configured to: determine, based on a contextual profile, compression parameters including a number of bits, a precision value, and a base value; read the number of bits from a stored compressed value; generate an intermediate value by multiplying the read bits by the precision value; and generate a location data component by adding the base value to the intermediate value.

In various alternative embodiments, the contextual compression filter is configured to scale a component of the original location data based on a parameter defined in the contextual profile.

In various alternative embodiments, the original location data includes a plurality of component values including a speed value and the location engine is configured to select a contextual profile based on the speed value.

It should be apparent that, in this manner, various exemplary embodiments enable a method and system for compressing location data. In particular, by using the location data to determine an appropriate compression method for a particular application and location, the location data may be efficiently compressed.

BRIEF DESCRIPTION OF THE DRAWINGS

In order to better understand various exemplary embodiments, reference is made to the accompanying drawings, wherein.

DETAILED DESCRIPTION OF THE EMBODIMENTS

Figure 1:
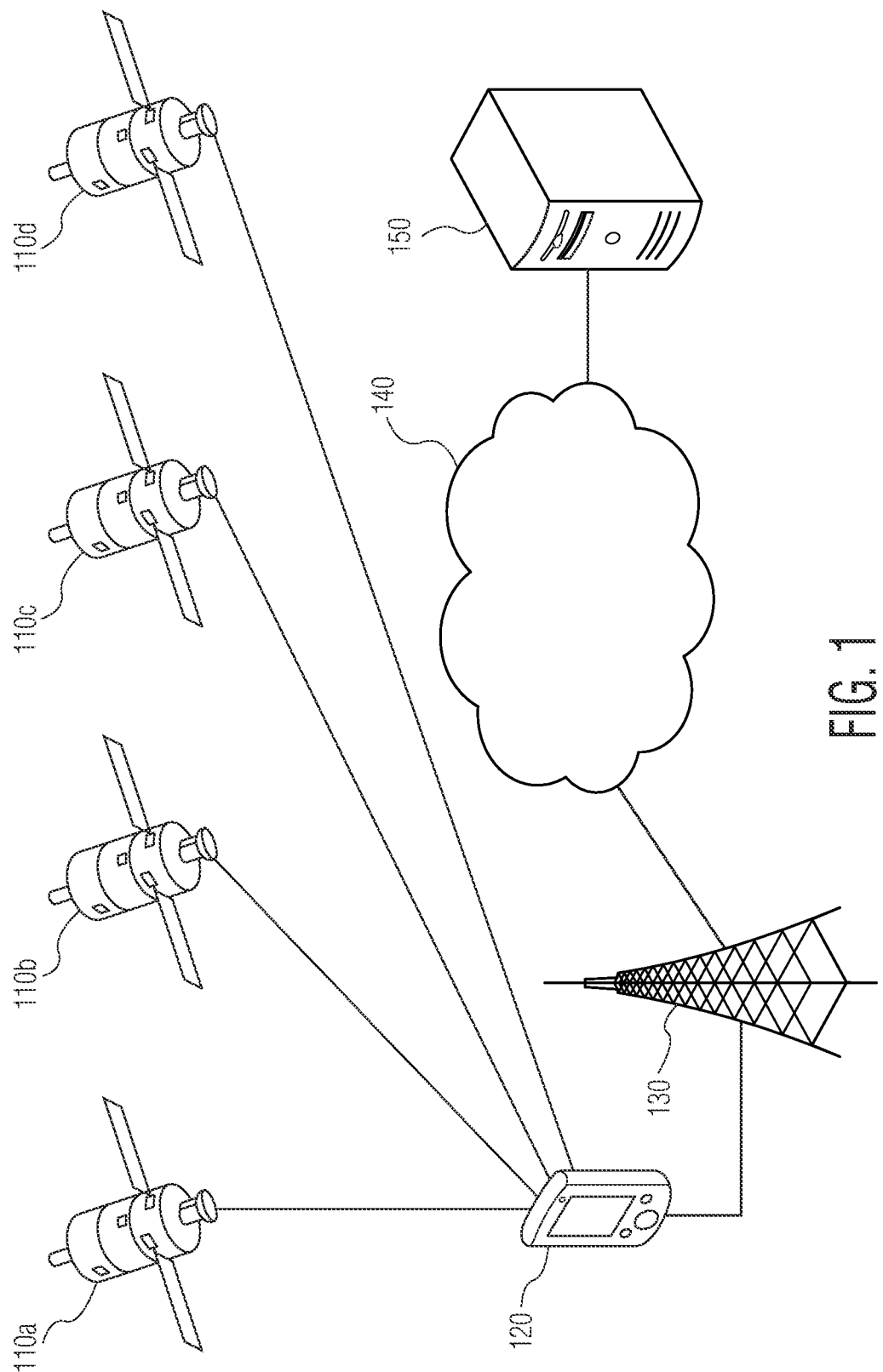
FIG. 1 illustrates a diagram of an exemplary geo-tracking system.

Location data standards are designed to represent location data for any location on the planet. They are also designed to be used by a variety of different applications including military applications. Many common civilian uses of location data are confined to predictable geographic areas and require less precision than provided by the location data standards. Compression of location data may reduce the amount of memory required to store location data and bandwidth required to transmit location data. This in turn may reduce communication costs, material costs, and power consumption.

Contextual compression of location data may provide an efficient method of compressing location data. In particular, contextual compression may make use of the received location data to determine an appropriate compression scheme. Contextual compression may minimize the size of location data without requiring complicated algorithms and processing.

Referring now to the drawings, in which like numerals refer to like components or steps, there are disclosed broad aspects of various exemplary embodiments.

FIG. 1 illustrates a diagram of an exemplary geo-tracking system. Exemplary geo-tracking system may be used to track a device 120 and store location data in a compressed format. The geo-tracking system may include satellites 110a-d, device 120, wireless access point 130, network 140 and server 150.

Satellites 110a-d may enable device 120 to determine its location. Satellites 110 may include a plurality of satellites 110a-d that transmits geospatial location data. For example, satellites 110a-d may be Global Positioning System (GPS) satellites. In various exemplary embodiments, at least four GPS satellites may be required for device 120 to determine its location. In various alternative embodiments, satellites 110a-d may be replaced by other means of determining location. For example, device 120 may determine its location from mobile network access points or wireless hotspots.

Device 120 may be any device capable of determining its location. For example, device 120 may include a Global Navigation Satellite System (GNSS) receiver. Device 120 may also include any device including a GNSS receiver such as, for example, a GPS receiver, mobile phone, PDA, tablet computer, automobile, airplane or watercraft. Device 120 may receive signals from satellites 110a-d and generate location data based on the signals. Device 120 may also take other physical measurements and associate the measurements with the location data. For example, device 120 may measure vehicle emissions, energy consumption, barometric pressure, and/or temperature.

As will be explained in further detail below regarding FIGS. 2-4, device 120 may first generate original location data according to a standard format. For example, device 120 may first generate location data according to the National Marine Electronics Association (NMEA) 0183 and Java Specification Request (JSR) 179 standards. Device 120 may compress this original location data using contextual compression to generate compressed location data. Device 120 may store compressed location data locally or transmit the compressed location data to, for example, server 150 via wireless access point 130 and network 140. Device 120 may also transmit other types of data including contextual profiles via wireless access point 130 and network 140.

Wireless access point 130 may be any access point for wirelessly receiving data from device 120. For example, wireless access point 130 may be a mobile phone network access point. In various alternative embodiments, wireless access point 130 may be a local area network access point. Wireless access point 130 may receive compressed location data from device 120 and forward the compressed location data to network 140. In various exemplary embodiments, wireless access point 130 may be associated with a network provider that charges by volume for data received at wireless access point 130. Transmitting compressed location data may result in lower network access charges than transmitting uncompressed location data.

Network 140 may include any network for transmitting data. Network 140, may include, for example, the Internet. Network 140 may transmit compressed location data originating at device 120 from wireless access point 130 to server 150. Compressed location data may take a variety of paths through network 140 before it reaches server 150.

Server 150 may be any computing device implementing a geo-tracking application. A geo-tracking application may be any application that makes use of location data. For example, geo-tracking applications may include navigation systems, fleet management systems, traffic management systems, vehicle security systems, emergency reporting systems, toll collection systems, photo tagging applications, fitness management applications, social networking applications, telemetry applications and others. Server 150 may receive location data from one or more devices such as device 120. Server 150 may process the received location data and provide results to device 120 or other devices. Server 150 may also store received location data. For example, a server 150 running a fleet management system may receive location data from numerous devices and store the location data for record keeping or future analysis.

Figure 2:
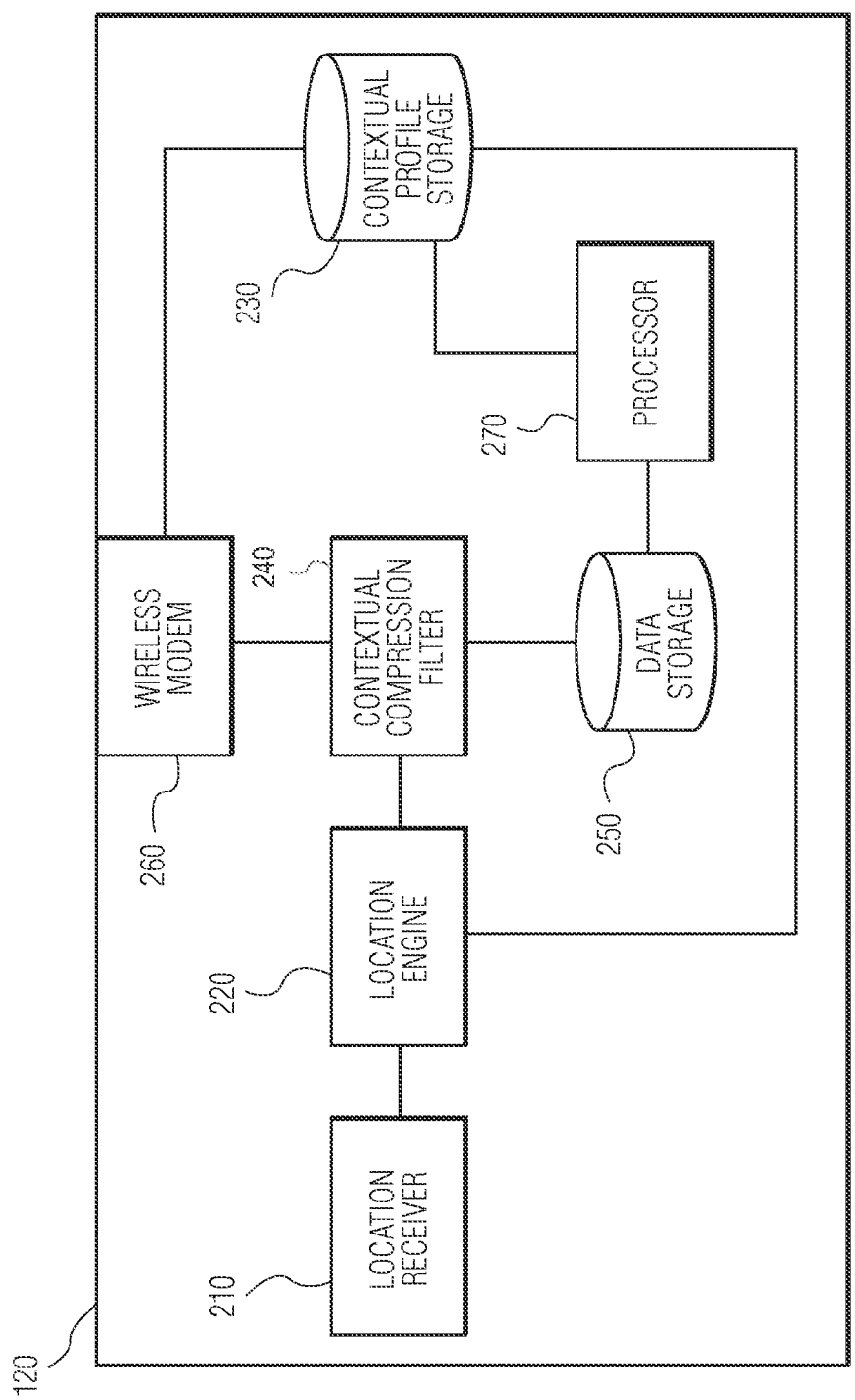
FIG. 2 illustrates a diagram of exemplary geo-tracking device.

FIG. 2 illustrates a diagram of exemplary geo-tracking device 120. Device 120 may correspond to device 120 shown in FIG. 1. Device 120 may include Location receiver 210, location engine 220, contextual profile storage 230, contextual compression filter 240, data storage 250, wireless modem 260, and processor 270.

Location receiver 210 may include any receiver capable of receiving GNSS signals. Location receiver 210 may include, for example, a GPS receiver, a GLONASS receiver, a BeiDou or Compass receiver, or a Galileo receiver. Location receiver 210 may use information received in GNSS signals to generate location data. In various alternative embodiments, location receiver 210 may also include receivers that generate location data based on terrestrial signals such as tactical air navigation system (TACAN), mobile network access points and local area network hotspots. Location receiver 210 may also measure other physical characteristics associated with device 120 at a particular time and location and include these measurements in the location data. For example, if device 120 is a motor vehicle, location receiver 210 it may be desirable to measure exhaust emissions and energy consumption.

Location data may include a variety of information related to the location of device 120. In particular, location data may include a time, longitude and latitude coordinates, and altitude. Location receiver 210 may also generate other types of location data based on comparisons of location data. For example, location receiver 210 may determine a speed by determining the change in location during a time interval. Location receiver 210 may also generate information such as error estimations. Location receiver 210 may output location data according to a standard such as NMEA 0183 or JSR 179. Location receiver 210 may output location data as a series of messages containing current location data. In various alternative embodiments, location receiver 210 may include an API that allows another component to query the receiver with a request for location data.

Location engine 220 may include hardware and/or executable instructions encoded on a machine-readable storage medium configured to determine a contextual profile based on location data. Location engine 220 may receive location data from location receiver 210. The received location data may be formatted according to a standard used by location receiver 210. Location engine 220 may extract relevant location information from the location data to determine a contextual profile. In various exemplary embodiments, location engine 220 may determine a contextual profile based on longitude and latitude coordinates. Location engine 220 may compare the longitude and latitude coordinates from the received location data with longitude and latitude coordinates defined in contextual profiles within contextual profile storage 230. Location engine 220 may receive other inputs including other location data such as speed and altitude or user selected inputs for determining the contextual profile. For example, a speed greater than, for instance 30 km/h, may indicate that device 120 is within a motorized vehicle and an appropriate contextual profile should be chosen. Alternatively, a user may enter and/or select a mode of transportation that may be useful for determining a contextual profile. Location engine 220 may forward the received location data to contextual compression filter 240 along with an indication of the selected contextual profile. Location engine 220 may continue to receive location data from location receiver 210 and forward the received location data to contextual compression filter 240. If location engine 220 determines that a contextual profile is no longer applicable to the received location data, location engine 220 may determine a new contextual profile and send an indication of the new contextual profile to contextual compression filter 240.

Contextual profile storage 230 may include any machine-readable medium capable of storing contextual profiles for use by device 120. Accordingly, contextual profile storage 230 may include a machine-readable storage medium such as read-only memory (ROM), random-access memory (RAM), magnetic disk storage media, optical storage media, flash-memory devices, and/or similar storage media. Contextual profile storage 230 may be accessed by location engine 220 to select a contextual profile. Contextual compression filter 240 may access contextual profile storage 230 to determine a compression method for the received location data. Contextual profile storage 230 may send contextual profiles to wireless modem 260 to provide the contextual profile to other devices such as server 150. The contextual profiles stored in contextual profile storage 230 will be described in greater detail below regarding FIG. 3.

Contextual compression filter 240 may include hardware and/or executable instructions encoded on a machine-readable storage medium configured to compress received location data using a contextual profile. Contextual compression filter 240 may receive an indication of a contextual profile from location engine 220. Contextual compression filter 240 may then look up the contextual profile in contextual compression profile storage 230 and determine an appropriate compression method. Contextual compression filter 240 may compress location data by scaling one or more components of the location data according to one or more parameters defined in the contextual profile. Contextual compression filter 240 may also compress location data by converting the location data to a different unit or a relative measurement. In various exemplary embodiments, contextual compression filter 240 may use base values, boundaries, precision levels and/or format data to determine how to compress the received location data. An exemplary method performed by contextual compression filter 240 for compressing a component of location data will be described in further detail below regarding FIG. 5.

In various alternative embodiments, contextual compression filter may execute instructions and/or computer code stored or indicated in the selected contextual profile. Once the location data has been compressed, contextual compression filter 240 may forward the compressed location data to data storage 250 and/or wireless modem 260.

Data storage 250 may include any machine-readable medium capable of storing compressed location data. Accordingly, data storage 250 may include a machine-readable storage medium such as read-only memory (ROM), random-access memory (RAM), magnetic disk storage media, optical storage media, flash-memory devices, and/or similar storage media. Data storage 250 may be used to store other data used by device 120. For example, if device 120 is a mobile phone, data storage 250 may be a phone memory or flash card used to store data for other mobile phone applications. Because the location data stored in data storage 250 has been compressed, the location data may consume less space, leaving more memory available for other applications. Additionally, compression of location data may allow use of a smaller and/or less expensive machine-readable medium.

Wireless modem 260 may be an interface comprising hardware and/or executable instructions encoded on a machine-readable storage medium configured to communicate with a wireless access point. For example, wireless modem 260 may include a mobile phone antenna for communicating with a mobile network access point. Wireless modem 260 may be used to transmit data, including compressed location data, to other device such as, for example, server 150. Because the location data transmitted via wireless modem 260 has been compressed, wireless modem 260 may use less bandwidth and or less power than if uncompressed data were transmitted.

Processor 270 may include any processor capable of executing instructions encoded on a machine-readable storage medium. For example, processor 270 may include a general computer processor, mobile phone processor, or integrated circuit. Processor 270 may be configured to execute a geo-tracking application. Processor 270 may use compressed location data. In particular, processor 270 may use a contextual profile stored in contextual profile storage 230 to decompress and read compressed location data stored in data storage 250. An exemplary method performed by processor 270 for using compressed location data will be described in further detail below regarding FIG. 6.

Figure 3:
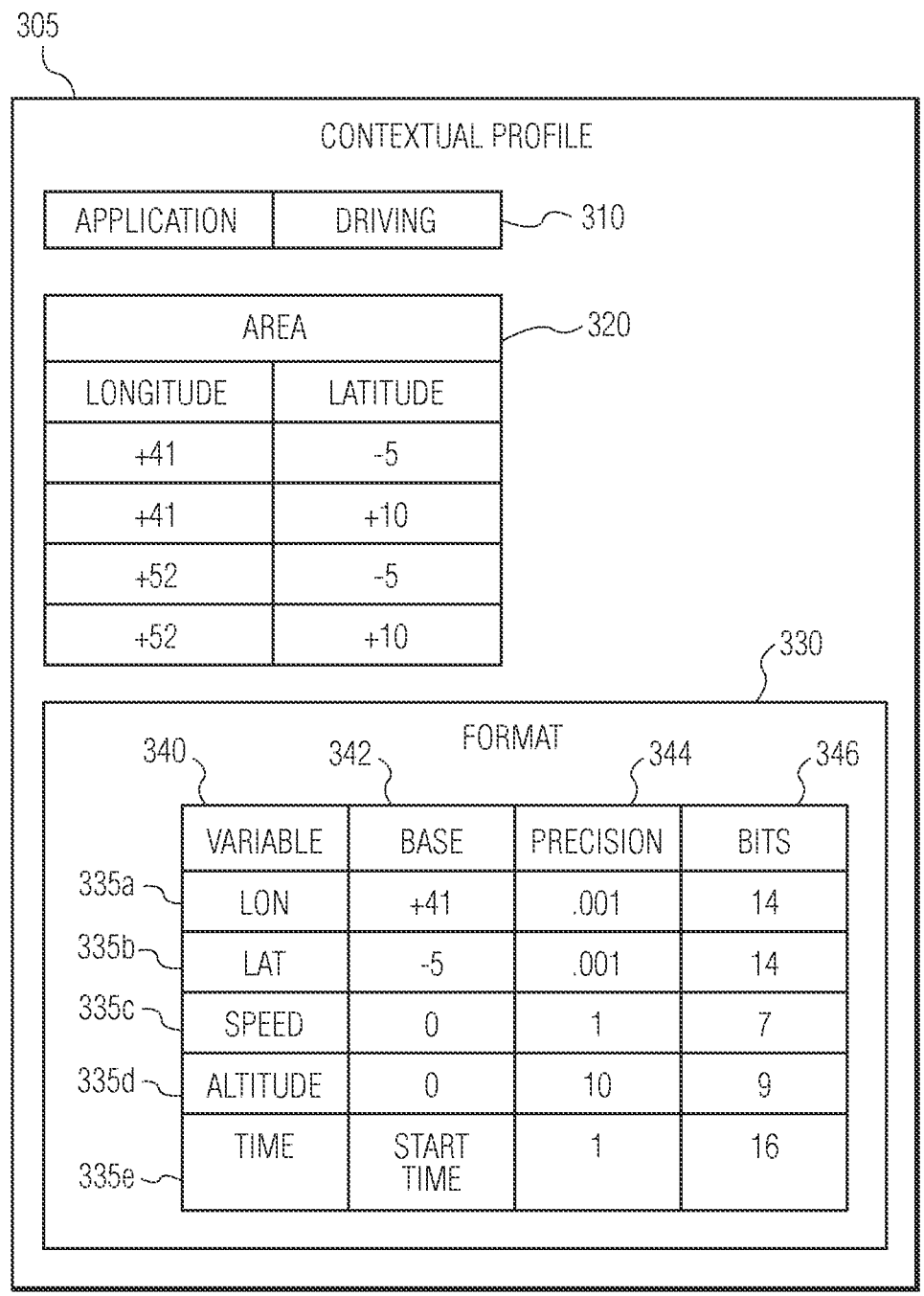
FIG. 3 illustrates an exemplary data structure for storing a contextual profile.

FIG. 3 illustrates an exemplary data structure for storing a contextual profile 305. It should be apparent that data structure may be implemented using a variety of data structures such as, for example, objects, arrays, linked lists, or trees. Data structure may be stored in contextual profile storage 230 or another computer-readable storage medium accessible to device 120. Data structure may include fields for application 310, area 320, and format 330.

Application field 310 may indicate a type of geo-tracking application. For example, application field 310 may indicate a mode of transportation for the geo-tracking application. Application field 310 may be used to distinguish two or more contextual profiles applicable to the same geographic area. For example, a contextual profile for walking may provide greater precision for coordinates or speed, but a lower maximum speed. In contrast, a contextual profile for driving a motor vehicle may provide less precision for speed, but a greater maximum speed.

Area field 320 may indicate a geographical area to which the contextual profile is applicable. Area field 320 may be used to select a contextual profile. The geographical area may be represented in various ways. In various exemplary embodiments, area field 320 may include a plurality of coordinate points that define a boundary of a geographic area. For example, field 320 may include the points: (+41°,−5°), (+41°,+10°), (+52°,−5°), and (+52°,+10°), given as (latitude, longitude) in degrees. These coordinate points may approximately define a geographical area within France. It should be apparent that a plurality of coordinate points may be used to define various geographical areas associated with different contextual profiles. For example, a contextual profile including a geographical area may be defined for a city with a certain speed limit. In various exemplary embodiments, a smaller area defined by area field 320 may allow greater compression or precision of location data. In various alternative embodiments, area field 320 may include minimum and maximum values for longitude and latitude.

Format field 330 may indicate a format and/or method for compressing the received location data. In various exemplary embodiments, format field 330 may include entries 335*a-e* for each component of the location data. Each of the entries 335*a-e* may include a sub-field for a variable 340, base value 342, precision value 344, and number of bits 346. Variable sub-field 340 may indicate the component of location data to which the entry applies. Base value sub-field 342 may indicate a base value that should be subtracted from the location data to compress the location data. Precision value sub-field 344 may indicate a level of precision of the compressed location data. Number of bits sub-field 346 may indicate the total number of bits used by the variable after the location data is compressed.

Exemplary contextual profile 305 may include multiple entries 335*a-e* for variables within the received location data that may be stored in a compressed format. It should be apparent that the exemplary values described below may be used in one possible contextual profile. For instance, exemplary contextual profile 305 may be used to compress location data for a device located on an automobile in France. Other contextual profiles may be created to fulfill the needs of applications operating in varying contexts.

Entry 335*a* may be an example of a format for compressing longitude data. Entry 335*a* may indicate that a base value of +41 may be subtracted from the received longitude value. Entry 335*a* may further indicate that the longitude should be stored to the nearest 0.001 minute and a total of 14 bits should be used. Entry 335*b* may indicate that a base value of −5 may be subtracted from the received latitude value. Entry 335*b* may further indicate that the latitude should be stored to the nearest 0.001 minute and a total of 14 bits should be used. Entry 335*c* may indicate that a base value of 0 may be subtracted from the received speed value. Entry 335*c* may further indicate that the speed should be stored to the nearest km/h and a total of 7 bits should be used. Entry 335*d* may indicate that a base value of 0 may be subtracted from the received altitude value. Entry 335*d* may further indicate that the altitude should be stored to the nearest 10 meters and a total of 9 bits should be used. Entry 335*e* may indicate that a base value of the start time may be subtracted from the received altitude value. Entry 335*e* may further indicate that the time should be stored to the nearest second and a total of 16 bits should be used.

Figure 4:
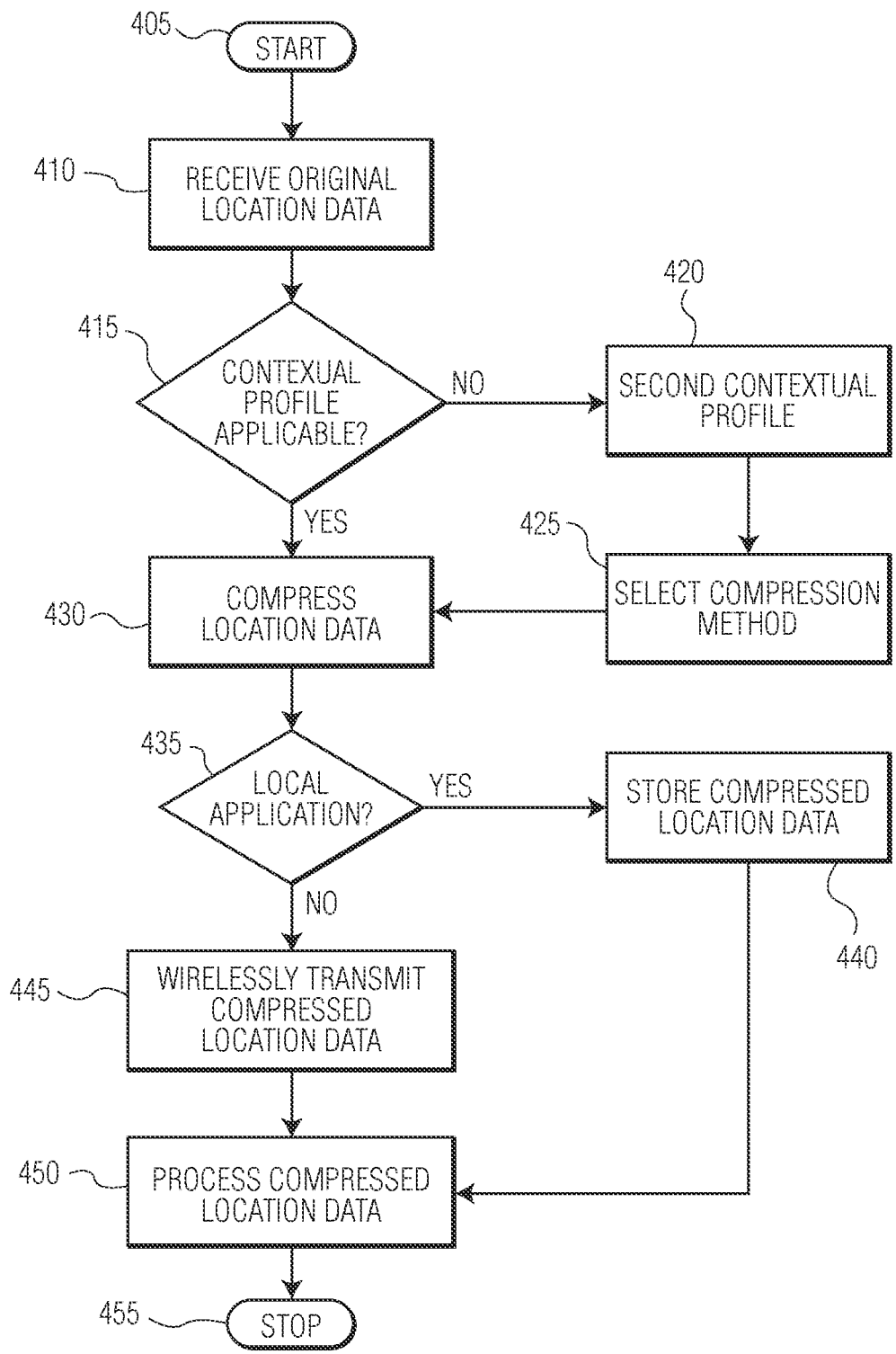
FIG. 4 illustrates a flowchart showing an exemplary method of compressing location data.

FIG. 4 illustrates a flowchart showing an exemplary method of compressing location data. Method may be performed by the various components of device 120 including location receiver 210, location engine 220, contextual compression filter 240, and wireless modem 260. Method may access contextual profile storage 230 and data storage 250. Method may begin at step 405 and proceed to step 410.

In step 410, device 120 may receive location data. The location data may be received via location receiver 210. Location receiver 210 may first receive signals from satellites 110*a-d*. Location receiver 210 may generate location data based on the signals from satellites 110a-d. The location data generated by location receiver 210 may use a standard format. In various exemplary embodiments, the standard format is a text string indicating multiple components of location data. In various alternative embodiments, location receiver 210 may provide individual components of location data or a set of location data using standard data types. Location receiver 210 may continuously generate location data as it receives signals from satellites 110a-d. For example, location receiver 210 may regularly output a text string of location data once per time interval such as once per second.

In step 415, device 120 may determine whether an applicable contextual profile has been selected for the received location data. The first time device 120 receives location data, no contextual profile may have been selected. If no contextual profile has been selected, the method may proceed to step 420. If a contextual profile has been selected, device 120 may compare the received location data to the contextual profile to determine whether the contextual profile is still applicable. For example, if the received longitude and latitude are outside of the geographic area defined by a contextual profile, the contextual profile may no longer be applicable. If the contextual profile is no longer applicable, the method may proceed to step 420. If the contextual profile is still applicable, the method may proceed to step 430.

In step 420, device 120 may select a contextual profile based on the received location data. Device 120 may compare the received location data with various fields of contextual profiles 305. In various exemplary embodiments, device 120 may compare the received location data with area field 320 to determine whether device 120 is within the defined geographical area. Device 120 may also compare user or application input with other fields of contextual profiles 305 such as application field 310. Device 120 may compare the location data to contextual profiles 305 until an applicable contextual profile is found. Contextual profiles 305 may be stored using known techniques for efficiently locating an applicable contextual profile. Once a contextual profile is selected, the method may proceed to step 425.

In step 425, device 120 may select a compression method. In various exemplary embodiments, device 120 may choose a compression method defined in the selected contextual profile. For example, device 120 may select compression parameters defining the base value, precision, and bits used for each component of the location data. Device 120 may generate an indication of the compression method chosen. The indication may be included with the compressed location data. For example, the indication of the compression method may be stored as a header to a log file including the compressed location data. The indication may also be transmitted to another node. In various exemplary embodiments, the contextual profile 305 may be transmitted as an indication of the compression method used.

In step 430, device 120 may compress the location data according to the selected compression method. Each component of the location data may be compressed individually and placed into a format for a set of location data defined by the contextual profile. The compression may involve some loss of precision of the data; however, the level of precision may be defined in the contextual profile so that it remains acceptable for the application.

Various compression methods may be used to compress the location data. Compression may include limiting the number of bits used to store the location data based on an expected data interval. The contextual profile may define the expected data interval. The number of bits may be limited by expressly defining a number of bits or defining a data type to store the compressed location data. Compression may include scaling the location data to have a defined level of precision. Device 120 may scale location data by dividing, rounding, using the most significant bits, shifting bits, or otherwise reducing precision. Compression may include changing units of the location data. For example, changing from degrees to meters may allow for storage of the location data as an integer rather than a floating point number. Compression may include using relative data instead of absolute data. The contextual profile may define an absolute value from which the relative data is based. The above described compression methods may be used alone or in combination as defined by a contextual profile. An exemplary method of compressing location data will be described in greater detail below regarding FIG. 5. Once a set of location data has been compressed, the method may proceed to step 435.

In step 435, device 120 may determine whether the compressed location data is to be used locally or remotely. If the compressed location data is to be used locally, the method may proceed to step 440. If the compressed location data is to be used remotely, the method may proceed to step 445.

In step 440, device 120 may store the compressed location data locally. Device 120 may store the compressed location data as a log file within data storage 250. The log file may include as a header the indication of the data compression method used. Alternatively, the log file may include one or more indications along with the compressed location data. If device 120 changes compression method or contextual profile while recording location data, the log file may indicate when the compression method or contextual profile changed. Once the compressed data has been stored, the method may proceed to step 450.

In step 445, device 120 may transmit the compressed location data via wireless modem 260. For example, device 120 may transmit the compressed location data to server 150. In various exemplary embodiments, the compressed location data may be transmitted as it is generated. Transmitting the compressed location data as it is generated may allow an application on a remote server to track the device 120. In various alternative embodiments, device 120 may buffer the compressed location data before transmitting it. Once the compressed data has been transmitted, the method may proceed to step 450.

In step 450, device 120 or server 150 may process the compressed location data. A set or individual component of compressed location data may be read and processed individually if the format of the compressed location data is known. For example, an application may process only the speed component of the location data by extracting only the bits that indicate the speed component. An exemplary method for reading compressed location data will be described in greater detail below regarding FIG. 6. Once processing of the compressed location data is complete, the method may proceed to step 455, where it ends.

Figure 5:
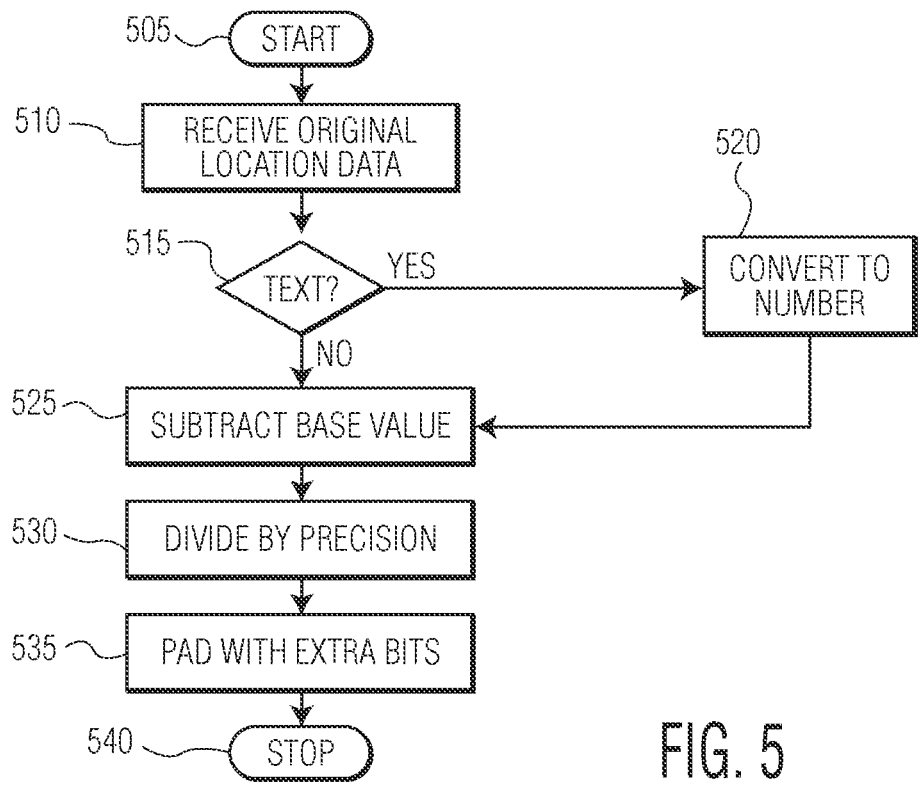
FIG. 5 illustrates a flowchart showing an exemplary method of compressing a component of location data.

FIG. 5 illustrates a flowchart showing an exemplary method of compressing a component of location data. The method may be performed by the various components of device 120, particularly contextual compression filter 240. The method may begin in step 505 and proceed to step 510.

In step 510, contextual compression filter 240 may receive a component of location data. The component may be formatted according to a GPSS standard. The method may then proceed to step 515.

In step 515, contextual compression filter 240 may determine whether the component is a text string. If the component is a text string, the method may proceed to step 520, where the text string may be converted to a number using known methods. The method may then proceed to step 525.

In step 525, contextual compression filter 240 may subtract the base value defined in the contextual profile from the location data component.

In step 530, contextual compression filter 240 may divide the result of step 525 by the precision value defined in the contextual profile. Any remainders may be rounded or ignored. In step 535, the result of step 530 may be stored in the number of bits defined by the contextual profile. Leading bits may be added or removed to obtain the defined number of bits.

Having described a method of compressing a component of location data, several examples will be given. The examples may use the contextual profile 305 including the values in format field 330. For the sake of simplicity, numbers will be given in decimal format rather than the binary format in which they may be stored. As a first example, contextual compression filter 240 may receive a speed component of location data as a 32 bit floating point number: 55.84 km/h. Subtracting the base value of 0, and dividing by the precision, this number becomes 55. This number can be stored in only 6 bits. An extra bit may be added to store the value in the 7 bits defined by the contextual profile 305. As long as the speed limit in the geographical area defined by a contextual profile is less than 128 km/h, any expected value may be stored in the 7 bits.

As a second example, contextual compression filter 240 may receive a UTC time as a 32 bit integer, for example, 1321646220. Contextual compression filter may use the time that the contextual profile was selected as a base value. If the contextual profile is chosen at 1321646220 and a second time is received 10 minutes later at 1321646820, the base value may be subtracted from the received second time with a result of 600, which may remain 600 when divided by a precision of 1. The 600 may then be padded with leading bits to store the value in the 16 bits defined by the contextual profile. A format using 16 bits for time with a precision of 1 second may allow the device 120 to track location data for over 18 hours. If the tracking time exceeds the limit for the number of bits, an indication of a new contextual profile with new base value may be used.

As a third example, contextual compression filter 240 may receive longitude as a floating point number: 49.18333. Contextual compression filter 240 may subtract the base value of 41 and divide by a precision of 0.001 resulting in a value of 8183. This value may be stored in 13 bits. An extra bit may be added to store the value in the 14 bits defined by the contextual profile. According to contextual profile 305, the longitude of any location within France may be stored using 14 bits with a precision of approximately 100 m. It should be apparent that defining a contextual profile for a smaller geographical area, a city for example, would allow any location within the city to be stored using fewer bits or greater precision.

Figure 6:
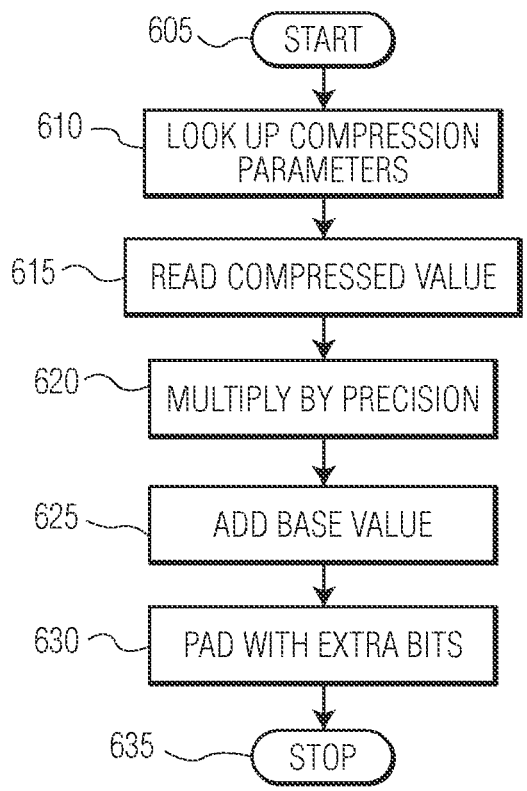
FIG. 6 illustrates a flowchart showing an exemplary method of using a compressed component of location data.

FIG. 6 illustrates a flowchart showing an exemplary method of using a compressed component of location data. The method may be performed by any processor capable of reading data stored in a machine-readable storage medium. The method may also be performed by a processor of device 120 or server 150. The method may begin in step 605 and proceed to step 610.

In step 610, the processor may look up compression parameters including a number of bits, a precision value, and a base value from an indication of the compression method used. In step 615, the processor may read the compressed value from, for example, a tracking log. The processor may read the number of bits indicated by the number of bits compression parameter. In step 620, the processor may multiply the compressed value by the precision value. In step 625, the processor may add the base value to the result of step 620. In step 630, the processor may convert the result of step 625 to the data type used by the processing application. In step 635, the method may end.

Having described an exemplary method of processing compressed location data values, several examples will be given. The examples may use the contextual profile 305 including the values in format field 330. For the sake of convenience, numbers will be given in decimal format rather than the binary format in which they may be stored. The example values described above regarding FIG. 5 will be used. From the first example, the value 55 may be read from a log file. Because the base value is 0 and the precision is 1, this value may simply be converted to the appropriate data type. It may be noted that the value 55 may have permanently lost precision from the original value 55.84. From the second example, the compressed value 600 may be multiplied by a precision value of 1 and the base value of 1321646220 may be added resulting in the original value of 1321646820. For the third example, the compressed value 8183 may be multiplied by the precision value of 0.001, and the base value of +41 may be added resulting in the value of 49.183. It may be noted that the value 49.183 may have permanently lost precision from the original value 49.18333.

According to the foregoing, various exemplary embodiments provide for a method and system for compressing location data. In particular, by using the location data to determine an appropriate compression method for a particular application and location, the location data may be efficiently compressed.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

The invention claimed is:

1. A method comprising:
in one or more processors:
receiving original location data;
selecting a contextual profile from a set of contextual profiles, each of the contextual profiles being at least defined by an application and a geographical area and at least some of the contextual profiles being at least defined by different ones of a plurality of geographical areas, wherein the selection of the contextual profile is based at least in part on an application and a comparison of the original location data with the geographical area defining the contextual profile;
selecting a compression method based on the selected contextual profile; and
converting the original location data to a compressed format based on the compression method.

2. The method of claim 1, further comprising:
receiving second location data;
determining that the contextual profile no longer applies;
selecting a second contextual profile;
selecting a second compression method based on the second contextual profile; and
converting the second location data to a second compressed format using fewer bits than the second location data according to the second compression method.

3. The method of claim 1, wherein the original location data includes a plurality of component values including a longitude value and a latitude value and the step of selecting a contextual profile comprises:
comparing the longitude value and the latitude value of the original location data to a geographical area defined for a contextual profile; and
selecting the contextual profile if the longitude and latitude are within the geographical area.

4. The method of claim 1, wherein the contextual profile includes for each component of the original location data: a base value, a precision value, and a number of bits, wherein each component of the original location data is stored using the corresponding number of bits.

5. The method of claim 1, further comprising storing an indication of the selected contextual profile.

6. The method of claim 1, wherein the original location data includes a plurality of component values including a speed value and the step of selecting a contextual profile comprises:
using the speed value to determine a mode of transportation; and
selecting a contextual profile based on the mode of transportation.

7. The method of claim 1, wherein the step of converting the original location data to a compressed format comprises scaling a component of the original location data.

8. The method of claim 1, wherein the step of converting the original location data to a compressed format comprises converting a component of the original location data to a relative measurement.

9. The method of claim 1 further comprising storing a set of contextual profiles each having at least one of a geographical area field and an application field, wherein said selection of a contextual profile is from a stored set of contextual profiles.

10. A system for compressing location data, the system comprising:
a location receiver configured to generate original location data based at least on signals from a global navigation satellite system satellites;
a location engine configured to select a contextual profile, from a set of contextual profiles, each contextual profile being at least defined by an application and at a geographical area and at least some of said contextual profiles being at least defined by different ones of a plurality of geographical areas, the selection being based at least in part on an application and a comparison of the original location data with the geographical area defining the contextual profile; and
a contextual compression filter configured to generate compressed location data in a compressed format based on the selected contextual profile.

11. The system of claim 10, wherein the original location data includes a plurality of component values including a longitude value and a latitude value and the location engine is configured to:
compare the longitude value and the latitude value of the original location data to a geographical area defined for a contextual profile; and
select the contextual profile if the longitude and latitude are within the geographical area.

12. The system of claim 10, wherein the contextual profile includes for each component of the original location data: a base value, a precision value, and a number of bits, wherein each component of the original location data is stored in the compressed format using the corresponding number of bits.

13. The system of claim 10, wherein the contextual compression filter is configured to, for each original component value:
generate an intermediate value by subtracting the base value from the original component value;
generate a compressed value by dividing the intermediate value by the precision value; and
store the compressed value in the compressed format.

14. The system of claim 10, further comprising a processor configured to:
determine, based on a contextual profile, compression parameters including a number of bits, a precision value, and a base value;
read the number of bits from a stored compressed value;
generate an intermediate value by multiplying the read bits by the precision value; and
generate a location data component by adding the base value to the intermediate value.

15. The system of claim 10, wherein the contextual compression filter is configured to scale a component of the original location data based on a parameter defined in the contextual profile.

16. The system of claim 10, wherein the original location data includes a plurality of component values including a speed value and the location engine is configured to select a contextual profile based on the speed value.

17. The system of claim 10 further comprising contextual profile storage storing said set of contextual profiles.

18. A geo-tracking device comprising:
a location receiver configured to generate original location data based at least on signals from a global navigation satellite system satellites;
contextual profile storage storing a set of contextual profiles each being defined by at least one of a geographical area and an application and at least some of said contextual profiles being at least defined by different ones of a plurality of geographical areas;
a location engine configured to select a contextual profile from said set of contextual profiles based at least in part on an application and the original location data; and a contextual compression filter configured to generate compressed location data in a compressed format based on the selected contextual profile.

* * * * *